US012548894B2

United States Patent
Li

(12) United States Patent
(10) Patent No.: US 12,548,894 B2
(45) Date of Patent: Feb. 10, 2026

(54) LENS FOR ELECTROMAGNETIC WAVES BASED ON ARTIFICIAL DIELECTRIC MATERIAL

(71) Applicant: Guangzhou Sigtenna Technology Co., Ltd., Guangdong (CN)

(72) Inventor: Zimeng Li, Guangdong (CN)

(73) Assignee: Guangzhou Sigtenna Technology Co., Ltd., Guangzhou (CN)

( * ) Notice: Subject to any disclaimer, the term of this patent is extended or adjusted under 35 U.S.C. 154(b) by 112 days.

(21) Appl. No.: 18/645,458

(22) Filed: Apr. 25, 2024

(65) Prior Publication Data

US 2024/0275037 A1 Aug. 15, 2024

Related U.S. Application Data

(63) Continuation of application No. PCT/CN2021/130194, filed on Nov. 12, 2021.

(30) Foreign Application Priority Data

Nov. 8, 2021 (CN) ......................... 202111318806.1

(51) Int. Cl.
*H01Q 1/42* (2006.01)
*H01Q 15/08* (2006.01)
*H01Q 19/06* (2006.01)

(52) U.S. Cl.
CPC ............. *H01Q 1/422* (2013.01); *H01Q 15/08* (2013.01)

(58) Field of Classification Search
CPC ............ H01Q 1/42; H01Q 1/422; H01Q 1/00; H01Q 15/00; H01Q 15/08; H01Q 15/10; H01Q 19/00; H01Q 19/06; H01Q 19/062
See application file for complete search history.

(56) References Cited

U.S. PATENT DOCUMENTS 3,296,685 A * 1/1967 Suliteanu ............. H01Q 15/144 343/912
4,148,039 A * 4/1979 Lunden .................. H01Q 1/424 343/872

(Continued)

FOREIGN PATENT DOCUMENTS

CN 216488529 U 5/2022
NZ 752904 A 12/2020
WO 2019/003939 A1 1/2019

OTHER PUBLICATIONS

International Search Report of PCT Patent Application No. PCT/CN2021/130194 issued on Jul. 27, 2022.

*Primary Examiner* — Tho G Phan

(57) ABSTRACT

A cylindrical focusing lens, including a dielectric radome (9, 49) and artificial dielectric material, in which the artificial dielectric material includes a plurality of sheets of a foam dielectric material disposed in layers and a plurality of conductive tubes placed in the sheets of the foam dielectric material, in which the conductive tubes disposed in the sheets of the foam dielectric material form a circle (5, 45) and a ring (8, 48) surrounding the circle (5, 45) and separated from the circle (5, 45) and from the radome (9, 49) by rings (10, 12, 50, 52) of the foam dielectric material without the conductive tubes. The aforementioned lens overcome the deficiencies of the known lenses made of lightweight artificial dielectric material and is well matched with a free space. Additionally, the lens is simpler to manufacture than known analogous.

20 Claims, 9 Drawing Sheets

(56) References Cited

U.S. PATENT DOCUMENTS

| | | | | |
|---|---|---|---|---|
| 6,229,500 | B1 * | 5/2001 | Caille | H01Q 3/14 343/753 |
| 8,471,757 | B2 * | 6/2013 | Yonemoto | H01Q 15/08 343/912 |
| 9,780,457 | B2 | 10/2017 | Bradley et al. | |
| 9,819,094 | B2 | 11/2017 | Matitsine et al. | |
| 10,971,823 | B1 | 4/2021 | Sledkov | |
| 11,145,987 | B2 * | 10/2021 | Xiao | C08L 25/06 |
| 11,431,100 | B2 * | 8/2022 | Galla | H01Q 1/246 |
| 11,811,136 | B2 * | 11/2023 | Xu | H01Q 15/0086 |

* cited by examiner

A-A

A-A

LENS FOR ELECTROMAGNETIC WAVES BASED ON ARTIFICIAL DIELECTRIC MATERIAL

CROSS REFERENCE TO RELATED APPLICATIONS

The present application is a Continuation Application of PCT Application No. PCT/CN2021/130194 filed on Nov. 12, 2021, which claims the benefit of Chinese Patent Application No. 202111318806.1 filed on Nov. 8, 2021. All the above are hereby incorporated by reference in their entirety.

FIELD

The present disclosure relates to focusing lenses for electromagnetic waves made of artificial dielectric materials.

BACKGROUND

Modern mobile communication market needs multi beams antennas creating narrow beams and operating in different frequency bands. Focusing dielectric lens is the main part of multi-beam antennas. Usually, multi-beam antennas contain Luneberg lenses matched with a free space because dielectric permittivity & of such lens decreases from a center towards outer contour in accordance with formula $\varepsilon=2-(R/A)2$ where R is the distance from the center of the lens to an interior point and A is the outer radius of the lens. Patent WO2019/003939A1 describes a thickness in a radially outer region of a Luneberg lens stacked by means of a disk member being less than a thickness in a center region. Diameter of a focusing lens has to be several wave length of an electromagnetic wave spreading through a lens to create a narrow beam. Therefore, some lenses of multi-beam antennas for mobile communication have diameter more than 1 m. Such lenses made of usual dielectric materials are too heavy. Therefore, many studies have been conducted in the art to create lightweight and low-loss lenses that provide desirable focusing characteristics.

Most lightweight artificial dielectric materials are made by randomly mixing small particles to have the isotropic properties of the final material. For example, U.S. Pat. No. 9,819,094B2 describes a cylindrical lens made of lightweight artificial isotropic dielectric material having a substantially homogeneous ε. A lens of such design provides more gain than Luneberg lens having the same diameter when a lens has diameter lesser than 3 wave lengths in a free space of the nominal operating frequency. Therefore, relatively small lens made of isotropic dielectric material having a substantially homogeneous ε are smaller than Luneberg lens providing the same gain but with some deficiencies.

Cylindrical lenses made of isotropic artificial dielectric materials depolarize the electromagnetic waves generated through such lenses, so that antennas including such lenses are subjected to high cross-polarization levels. U.S. Pat. No. 9,819,094B2 describes a multi-beam antenna including a special element known as a compensator provided around the lens. The compensator reduces the depolarization of electromagnetic waves passing through the cylindrical lens and improves the cross-polarization ratio of the multi-beam antenna, but increases the manufacturing cost. Another defect of lenses made of isotropic dielectric materials with essentially homogeneous dielectric permittivity & is the large reflection from the outer contour of the lens. U.S. Pat. No. 9,780,457B2 describes a design improving matching a lens with a free space. Lens includes a plurality of compartments for light isotropic dielectric materials having a substantially homogeneous ε. A dielectric material filling compartments disposed nearly center of a lens has bigger dielectric permittivity ε than a dielectric material filling compartments disposed nearly an outer contour of the lens. The lens of such design is better matched with a free space but more complicated for manufacturing and provides lesser directivity than a lens having homogenous dielectric permittivity ε.

Cylindrical lens made of anisotropic dielectric material may reduce depolarization of electromagnetic wave passed through cylindrical lens and improve cross polarization ratio of multi beam antenna.

The lightweight artificial dielectric materials providing anisotropic properties and suitable for manufacturing cylindrical lens were described by New Zealand Patent No. 752904 and U.S. Pat. No. 10,971,823B1. This material consists of conductive tubes with thin walls placed in layers and the foam dielectric material. Each layer includes a sheet of foam dielectric material with a plurality of holes. The conductive tubes with thin walls are placed in the holes made of lightweight dielectric material. Layers with tubes are separated by layers of a lightweight dielectric material without tubes. The New Zealand Patent No. 752904 describes a material with axes of all conductive tubes perpendicular to the layers. Such structure provides dielectric permittivity & up to 2.5 for electromagnetic wave spreading along the axes of tubes but its dielectric permittivity & is significantly smaller for electromagnetic wave spreading in a perpendicular direction. U.S. Pat. No. 10,971,823B1 describes an artificial dielectric material including tubes having axes perpendicular to the layers and in parallel to the layers. Thanks to different orientations of conductive tubes such material provides desirable anisotropic properties decreasing cross polarization level of antennas comprising cylindrical lenses.

Lenses focusing radio frequency waves have to be well matched with a free space to improve return loss and isolation of multi beam antennas. Therefore, it is desired to provide a lens made of new artificial dielectric materials to be well matched with a free space.

SUMMARY

The first objective of the present disclosure is to overcome deficiencies of the known lenses made of lightweight artificial dielectric material and provide a compact lens well matched with a free space. The second objective of the present disclosure is to provide lenses well matched with a free space which is simpler for manufacturing compare with known analogous.

The present disclosure provides a cylindrical focusing lens, including a dielectric radome and artificial dielectric material, in which the artificial dielectric material includes a plurality of sheets of a foam dielectric material disposed in layers and a plurality of conductive tubes placed in the sheets of the foam dielectric material. Cross-sections of the conductive tubes may be circular or polygonal, such as square, hexagonal or octagonal. The conductive tubes disposed in the dielectric sheet form a circle and a ring surrounding the circle and separated from the circle and from the radome by rings of the foam dielectric material without conductive tubes. The sheets of the foam dielectric material containing the conductive tubes are separated by sheets of the foam dielectric material without the conductive tubes.

The circle containing the conductive tubes forms one layer of a focusing cylinder. Two rings of the foam dielectric material and the ring containing the conductive tubes form a wideband transformer matching the circle containing the conductive tubes with a free space. The conductive tubes forming the circle may be disposed in a shape of any lattice described by New Zealand Patent No. 752904 and U.S. Pat. No. 10,971,823B1. The lens including tubes forming other shaped lattices may also be matched to free space by means of a transformer containing a ring with tubes and a ring with a foam dielectric material. In some lenses operating at frequencies below 1 GHz and having large dimensions rings of foam dielectric material may be replaced by air gaps to make ones lighter and save foam dielectric material.

Axes of the conductive tubes forming a ring and a circle of one layer could be directed at the same direction or at different directions.

Axes of the conductive tubes placed in different layers could be directed at the same direction or at different directions.

Axes of the conductive tubes placed in one layer could be directed perpendicular to the layer or in parallel to the layer.

Axes of the conductive tubes placed in one layer and directed in parallel to the layer could be directed perpendicular to axes of the conductive tubes disposed at adjacent layer and directed in parallel to the adjacent layer.

Widths of the rings forming the wideband transformer depend of operational frequency band and thickness of the dielectric radome which is an outer portion of the wideband transformer.

A width of the ring of the foam dielectric material without the conductive tubes disposed between the circle and the ring with the conductive tubes may be 0.2-0.8 times of a width of the ring with the conductive tubes. A width of the ring of the foam dielectric material without the conductive tubes disposed between the radome and the ring with the conductive tubes may be 1.0-4.0 times a width of the ring of the foam dielectric material with the conductive tubes.

The conductive tubes placed in neighboring layers could be placed above each other on the same axes or shifted from each other and have different axes.

The conductive tubes are disposed with different orientation of their axes. Axes of some conductive tubes are directed perpendicular to the layers and axes of other conductive tubes are directed in parallel to the layers. The conductive tubes having axes directed in parallel to the layers could be disposed in perpendicular to each other. Thus, the axes of the conductive tubes have three orthogonal directions. As a result, dielectric properties of the matching layers less dependent from direction and polarization of electromagnetic wave crossing the material.

The conductive tubes placed in one layer could have the same orientation of axes or different orientation. Placed above each other layers containing the conductive tubes could have the same structure or different structures.

Lenses including the provided transformer don't contain additional elements therefore ones are simpler for manufacturing compared with known analogues. The transformers of such kind may be applied for matching of focusing lenses of other kinds.

For other applications, the conductive tubes disposed in a layer may form other lattices and lenses may include other quantity of different layers. For example, a cylindrical lens assembled of two kinds of different layers is shown in FIGS. 3*a*-3*e* where each layer includes a plurality of the conductive tubes placed in circles and having two orthogonal orientations of its axes.

Figure 3A:
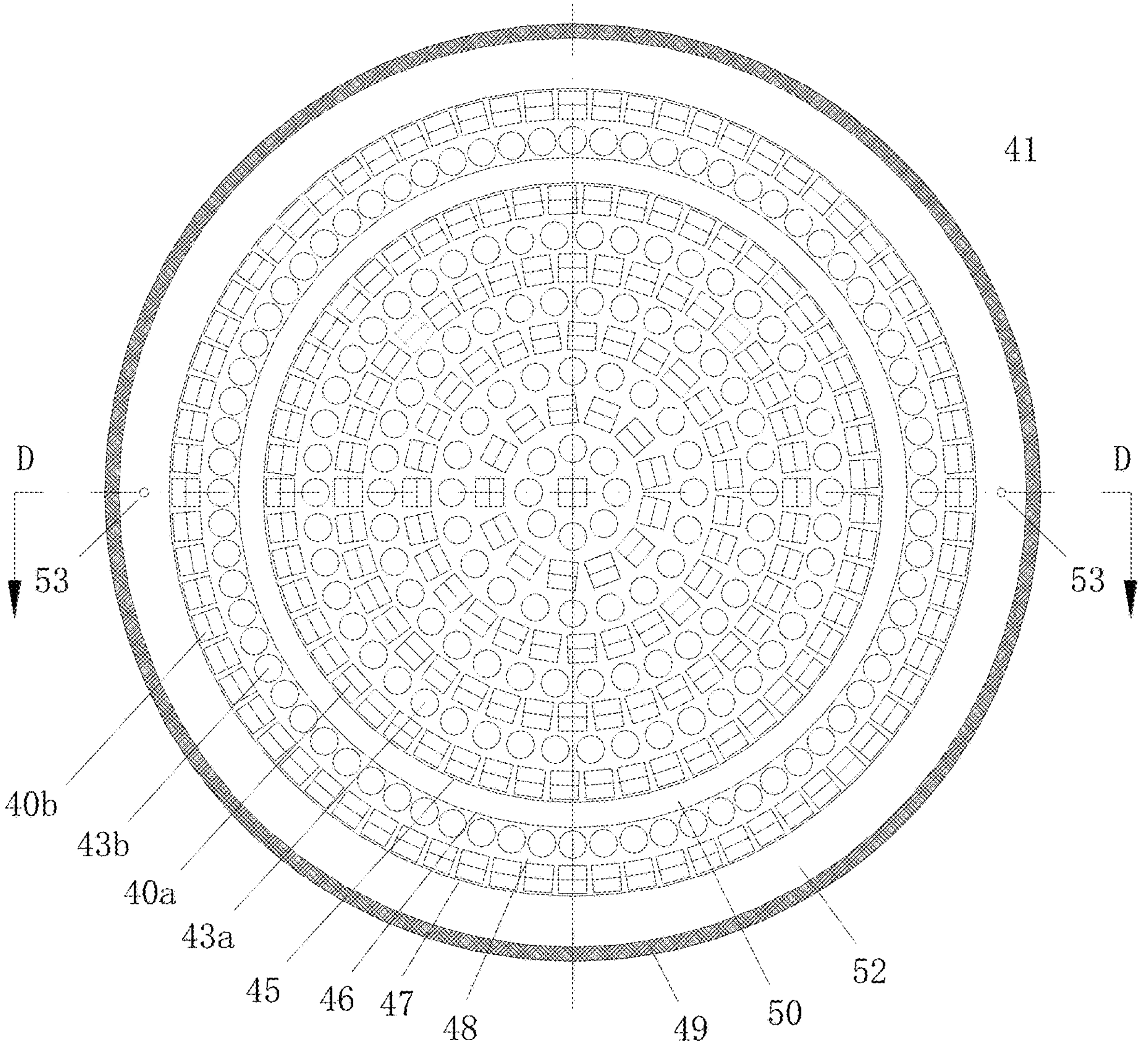
Figure 3B:
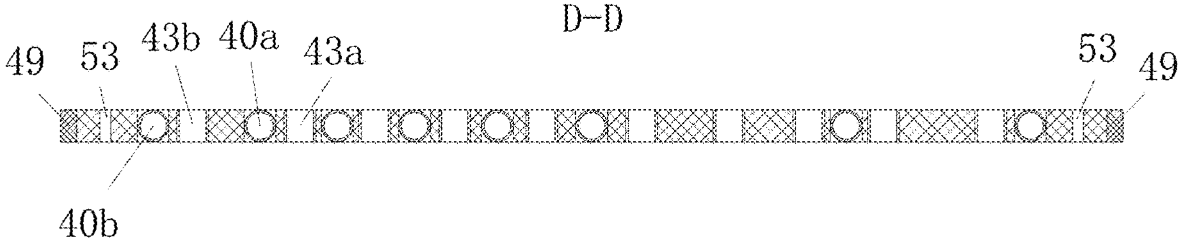

FIGS. 3*a* and 3*b* shows the top view and a cross-section D-D accordingly of a first layer. Axes of the conductive tubes forming odd circles are directed along a layer and along the circle. Axes of the conductive tubes forming even circles are directed perpendicular to a layer.

Figure 3C:
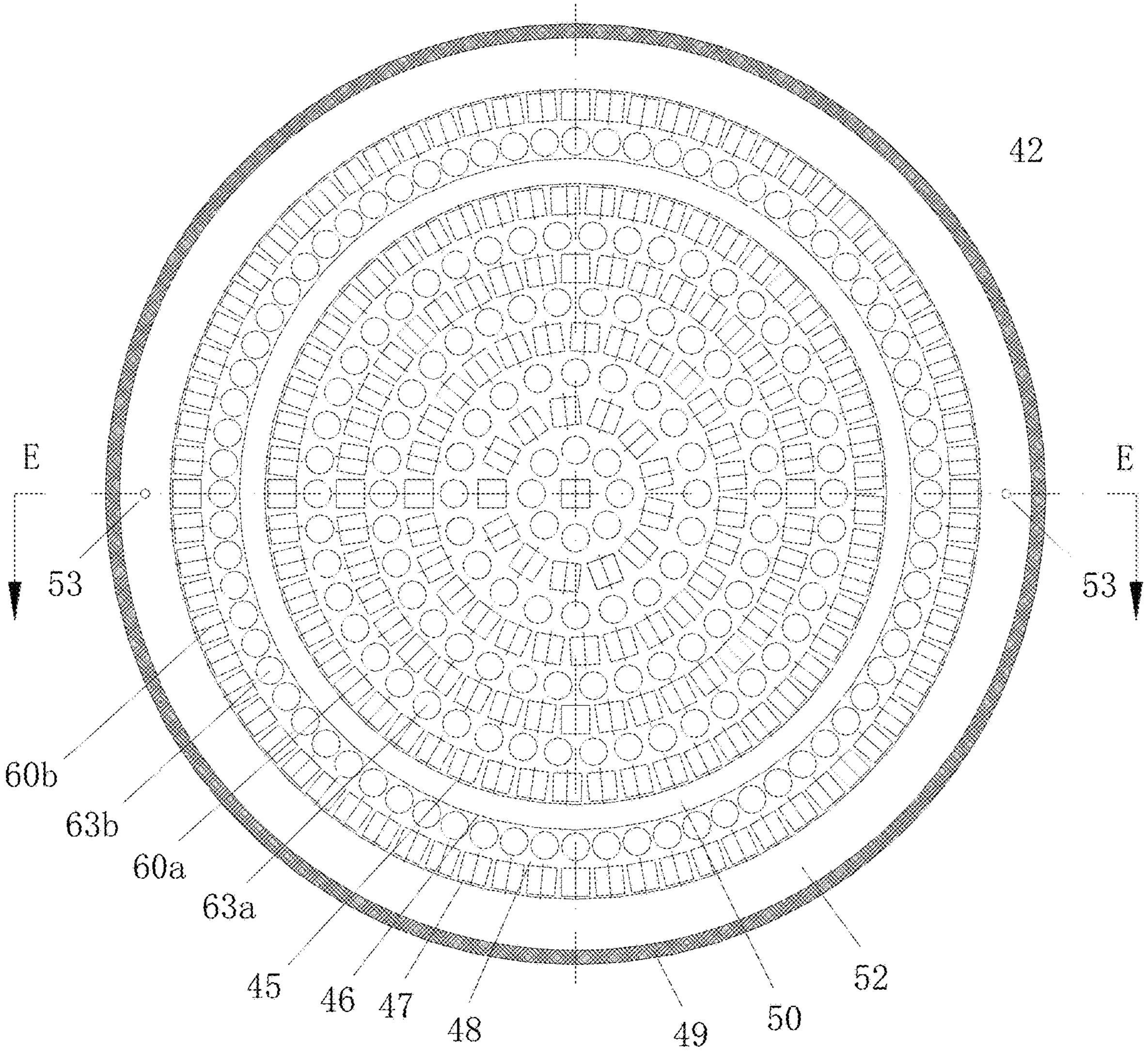
Figure 3D:
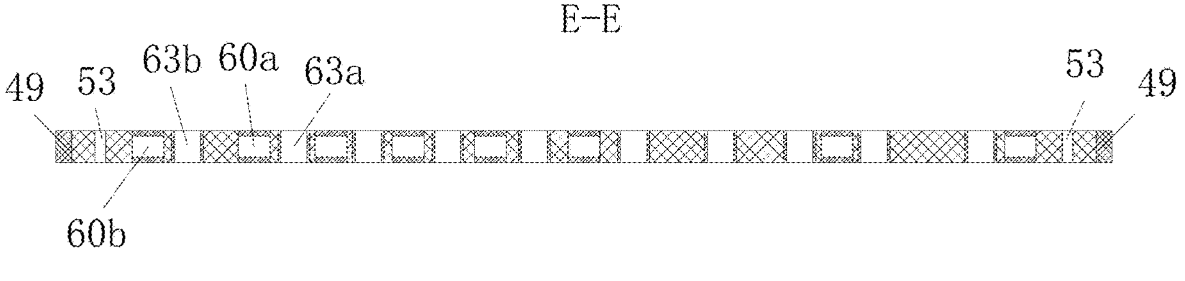

FIGS. 3*c* and 3*d* show a top view and a cross-section E-E accordingly of a second layer. Axes of the conductive tubes forming odd circles are directed along a layer and perpendicular the circle. Axes of the conductive tubes forming even circles are directed perpendicular to a layer.

Figure 3E:
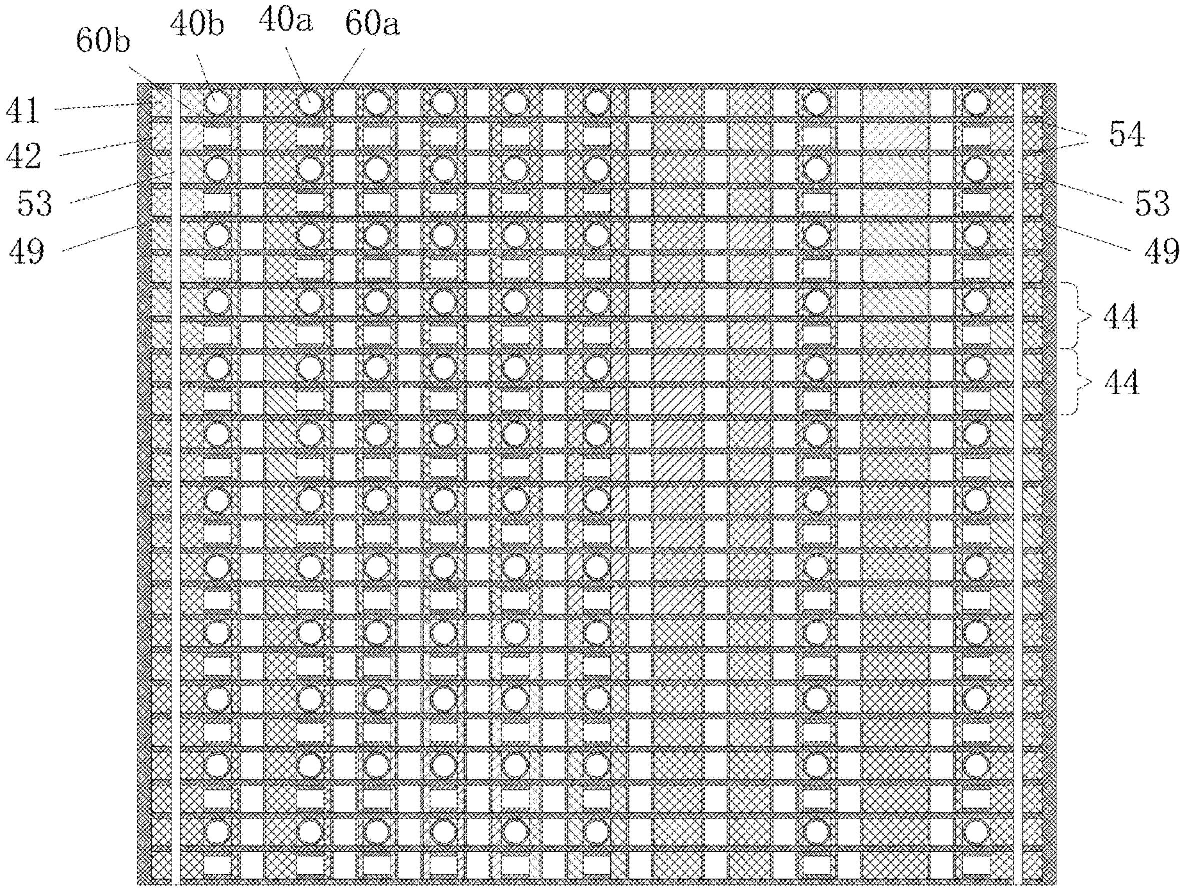

FIG. 3*e* shows cross-section A-A of a cylindrical lens including 24 layers shown in FIGS. 3*a*-3*d* and separated by layers of a foam dielectric material without conductive tubes.

DETAILED DESCRIPTION OF THE EMBODIMENTS

For a better understanding and implementation, the technical solutions in the embodiments of the present disclosure are clearly and completely described below in conjunction with the attached drawings. The drawings provide several exemplary embodiments of a cylindrical lens made of a light artificial dielectric material containing conductive tubes and the manner in which the conductive tubes may be arranged to match the lens with a free space.

Unless otherwise defined, all terms including technical and scientific terms used herein have the same meaning as commonly understood by those skilled in the art to which the present disclosure belongs. The terms used herein in the specification of the present disclosure are used only to describe specific embodiments and are not intended as a limitation of the disclosure.

A first embodiment of the present disclosure shown in FIGS. 1*a*-1*g* is a cylindrical lens assembled of three kinds of different layers.

Figure 1A:
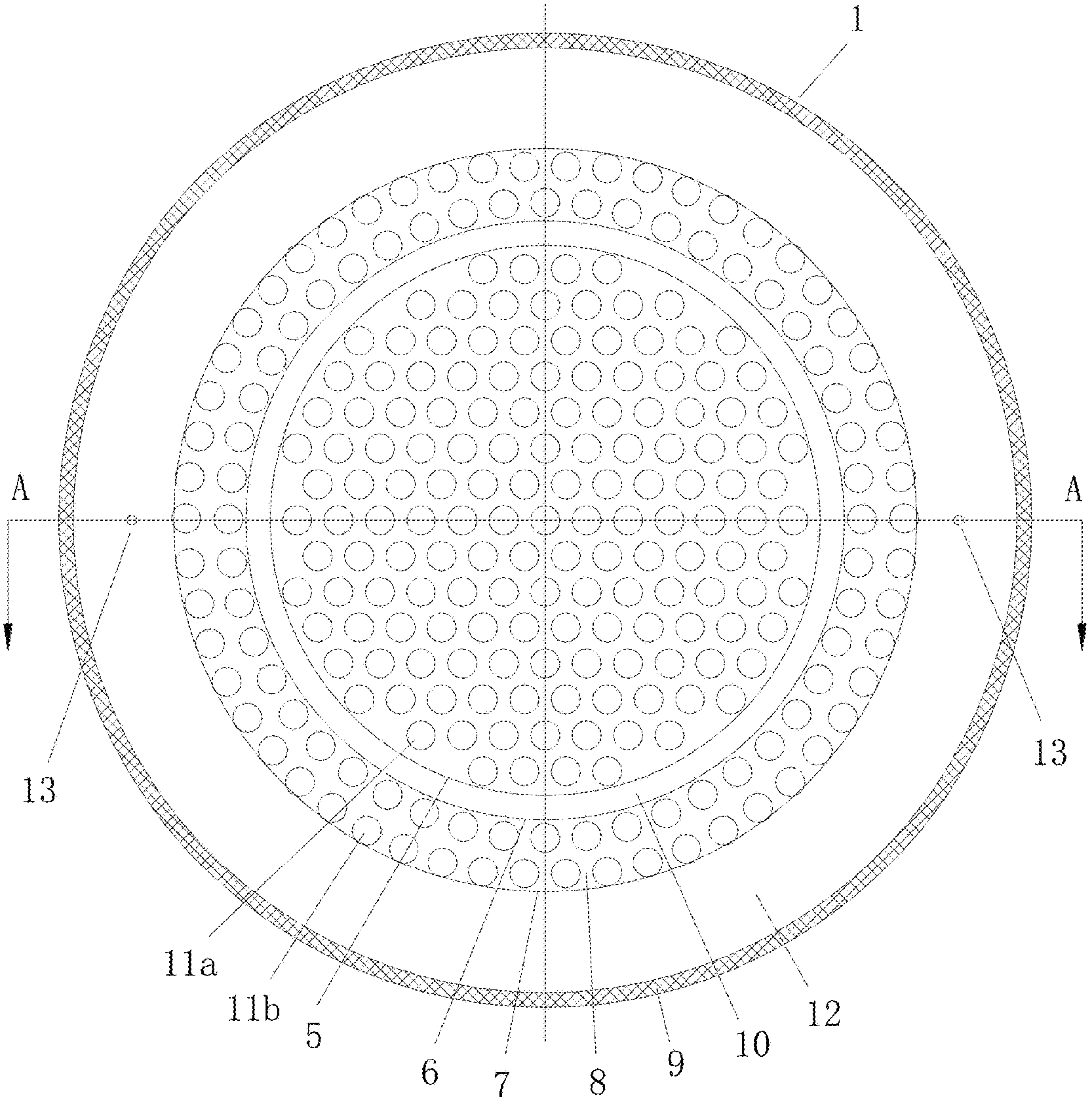
FIGS. 1*a* and 1*b* show a top view and a cross-section A-A accordingly of a first layer of a cylindrical lens where conductive tubes forming a circle are disposed in a shape of a hexagonal lattice and axes of the conductive tubes are directed perpendicular to the layer.
Figure 1B:
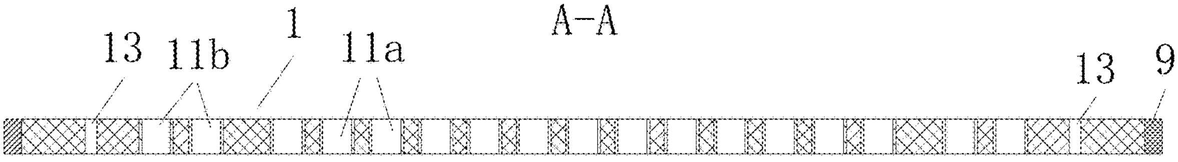

FIGS. 1*a* and 1*b* show a top view and a cross-section A-A accordingly of a first layer 1 of a cylindrical lens where conductive tubes 11*a* disposed inside of a circle 5 are arranged in a shape of a hexagonal lattice and axes of the conductive tubes 11*a* directed perpendicular to the layer and in parallel to a cross-section A-A. conductive tubes 11*b* disposed between rings 6 and 7 are arranged in two circles forming a ring 8 disposed between a circle 5 and a dielectric radome 9 and separated from ones by rings 10 and 12 formed by a foam dielectric material without conductive tubes. Axes of tubes 11*b* are directed perpendicular to the layer and in parallel to a cross-section A-A. Thin dielectric rods 13 pass through all layers and fix mutual disposition of layers forming the lens.

Figure 1C:
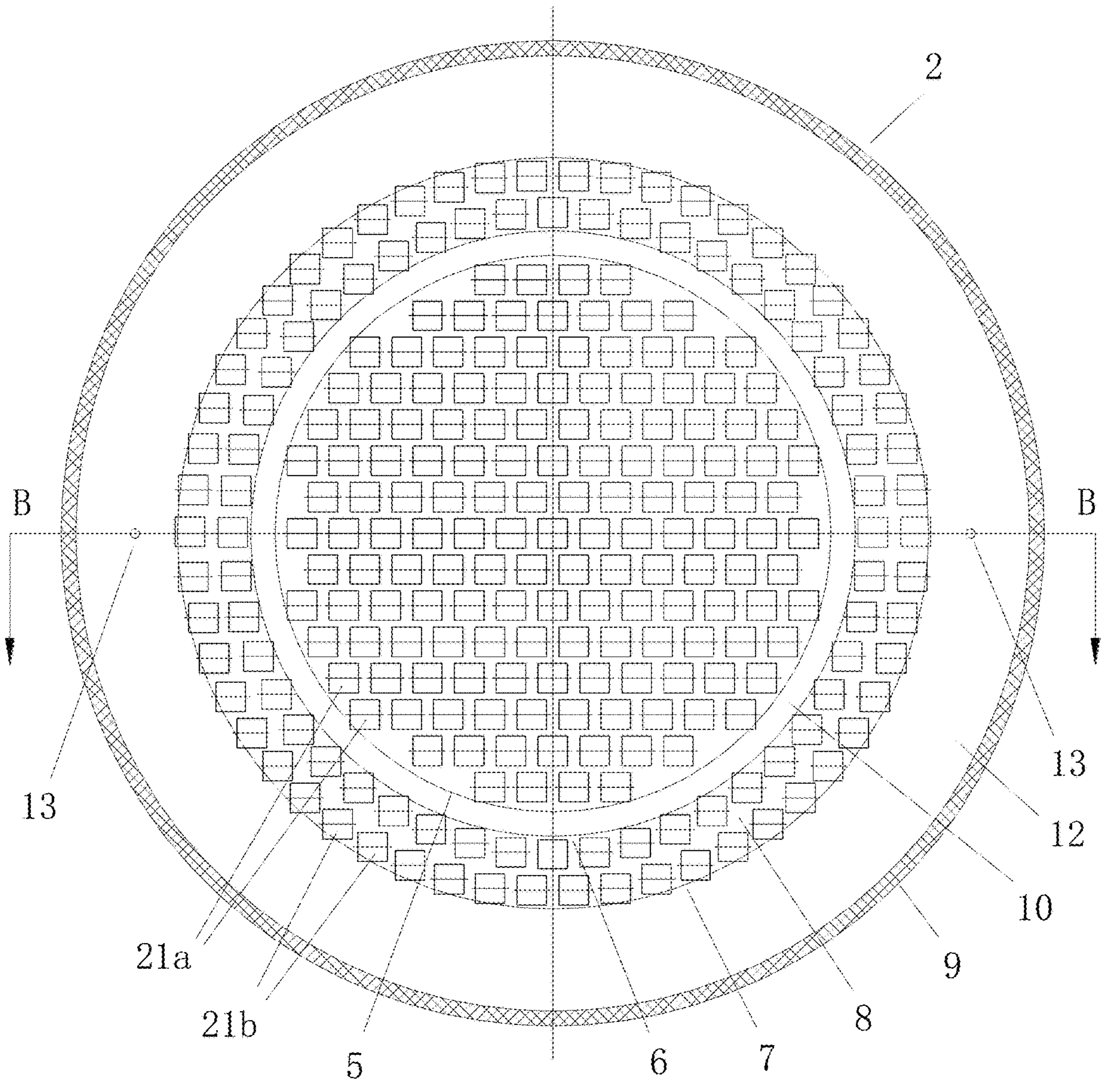
FIGS. 1*c* and 1*d* show a top view and a cross-section B-B accordingly of a second layer of a cylindrical lens where the conductive tubes forming a circle are disposed in a shape of a hexagonal lattice and axes of the tubes are directed in parallel to the layer and in parallel to cross-section B-B.
Figure 1D:
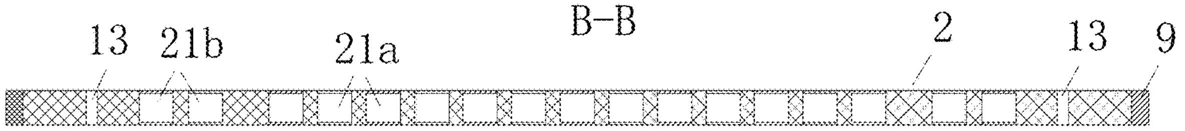

FIGS. 1*c* and 1*d* show a top view and a cross-section B-B accordingly of a second layer 2 of a cylindrical lens where conductive tubes 21*a* forming a circle 5 are disposed in a shape of a hexagonal lattice and axes of the conductive tubes 21*a* are directed in parallel to the layer and in parallel to cross-section B-B. conductive tubes 21*b* disposed between rings 6 and 7 are arranged in two circles forming a ring 8 disposed between a circle 8 and a dielectric radome 9 and separated from ones by rings 10 and 12 formed by a foam dielectric material without conductive tubes. Axes of conductive tubes 21*b* are directed in parallel to the layer and in parallel to a cross-section B-B.

Figure 1E:
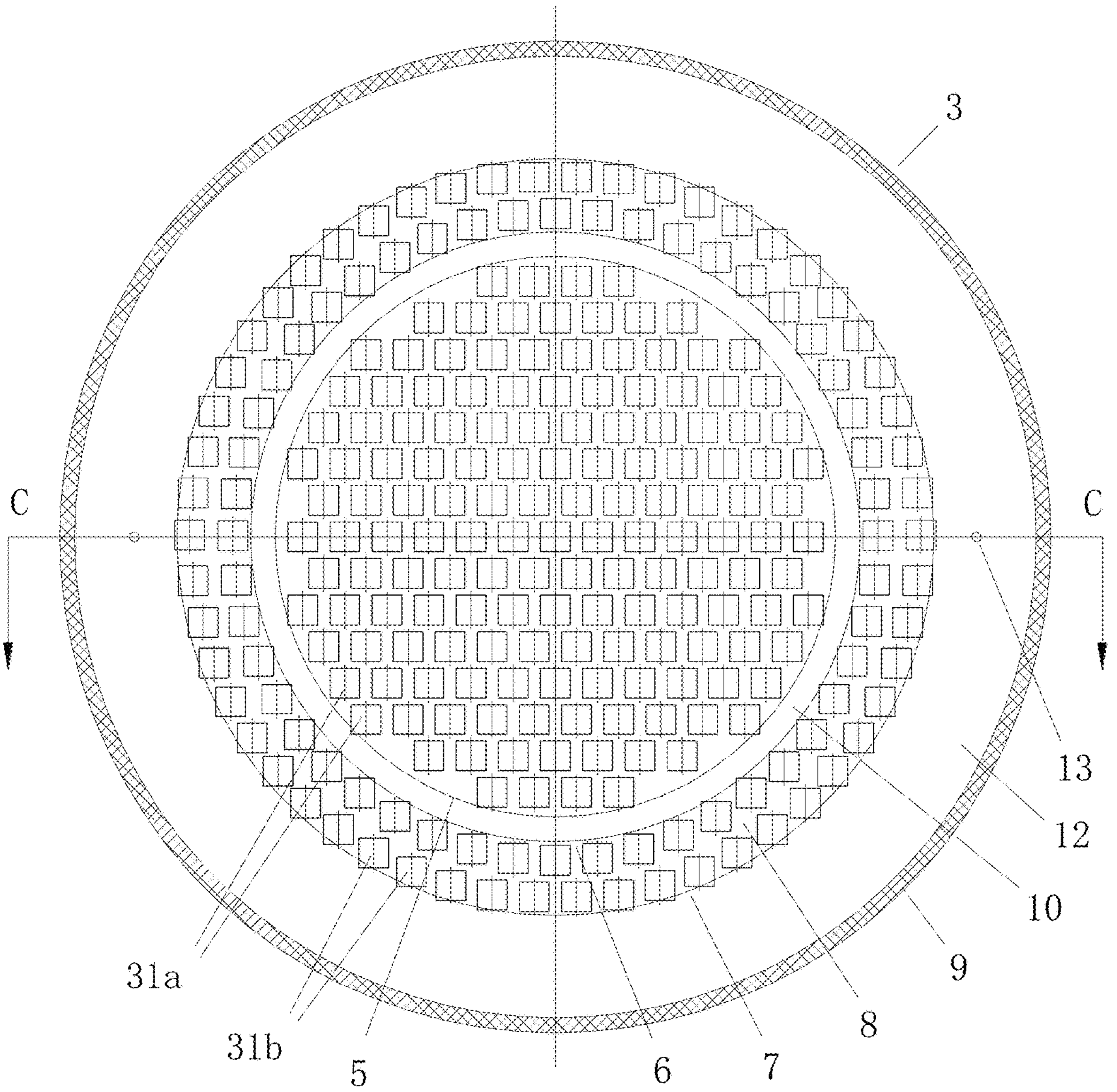
FIGS. 1*e* and 1*f* show a top view and a cross-section C-C accordingly of a third layer of a cylindrical lens where conductive tubes forming a circle are disposed in a shape of a hexagonal lattice and axes of the conductive tubes are directed in parallel to the layer and perpendicular to cross-section C-C.
Figure 1F:
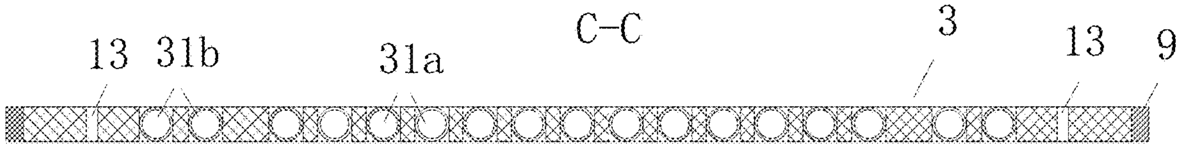

FIGS. 1*e* and 1*f* show a top view and a cross-section C-C accordingly of a third layer of a cylindrical lens where conductive tubes 31*a* forming a circle 5 are disposed in a shape of a hexagonal lattice and axes of the conductive tubes 31*a* are directed in parallel to the layer and perpendicular to cross-section C-C. conductive tubes 31*b* disposed between rings 6 and 7 are arranged in two rings forming a ring 8 disposed between a circle 5 and a dielectric radome 9 and separated from ones by rings 10 and 12 formed by a foam dielectric material without conductive tubes. Axes of conductive tubes 31*b* are directed in parallel to the layer and perpendicular to a cross-section C-C.

Figure 1G:
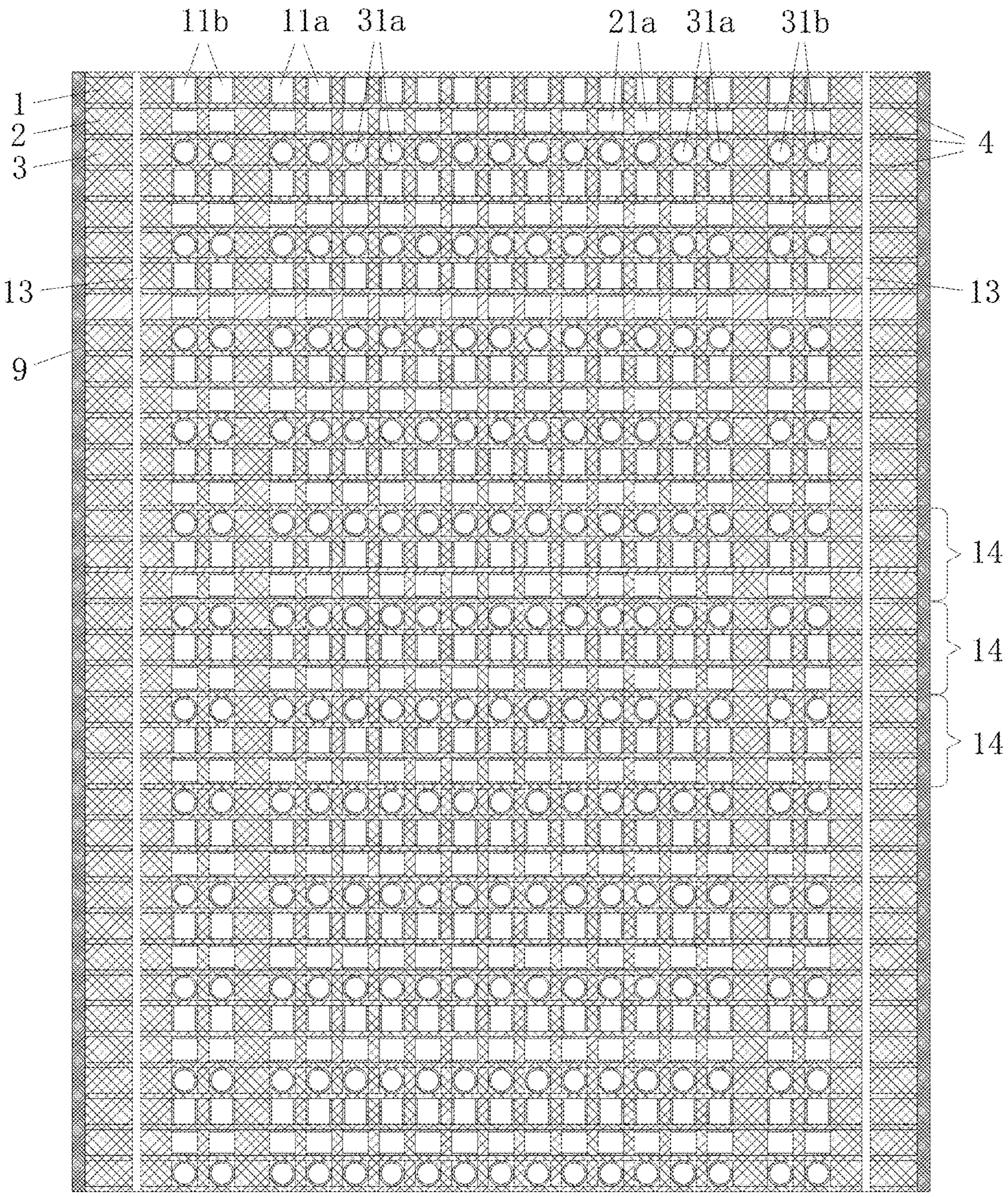
FIG. 1*g* shows cross-section A-A of a cylindrical lens including 36 layers shown in FIGS. 1*a*-1*f* and separated by layers of a foam dielectric material without the conductive tubes. The lens is assembled of three kinds of different layers.

FIG. 1*g* shows the cross-section A-A of a cylindrical lens comprising layers with the conductive tubes shown in FIGS. 1*a*-1*f* separated by layers 4 of a foam dielectric material without conductive tubes. The layers are stacked together forming twelve assembling 14 providing desirable anisotropic properties. The lens provides improved matching with a free space because the rings 8, 10 and 12 having different values of dielectric permittivity ε reflect electromagnetic wave passing through the lens in anti-phase compared with reflections from the radome 9 and the circle 5. Additional reflections from the rings 8, 10 and 12 suppress reflections from the radome 9 and the circle 5 and improve matching the lens with a free space. Widths of the rings 8, 10 and 12 providing the best matching depend of the nominal operating frequency and thickness and dielectric permittivity ε of the radome 9.

Figure 2A:
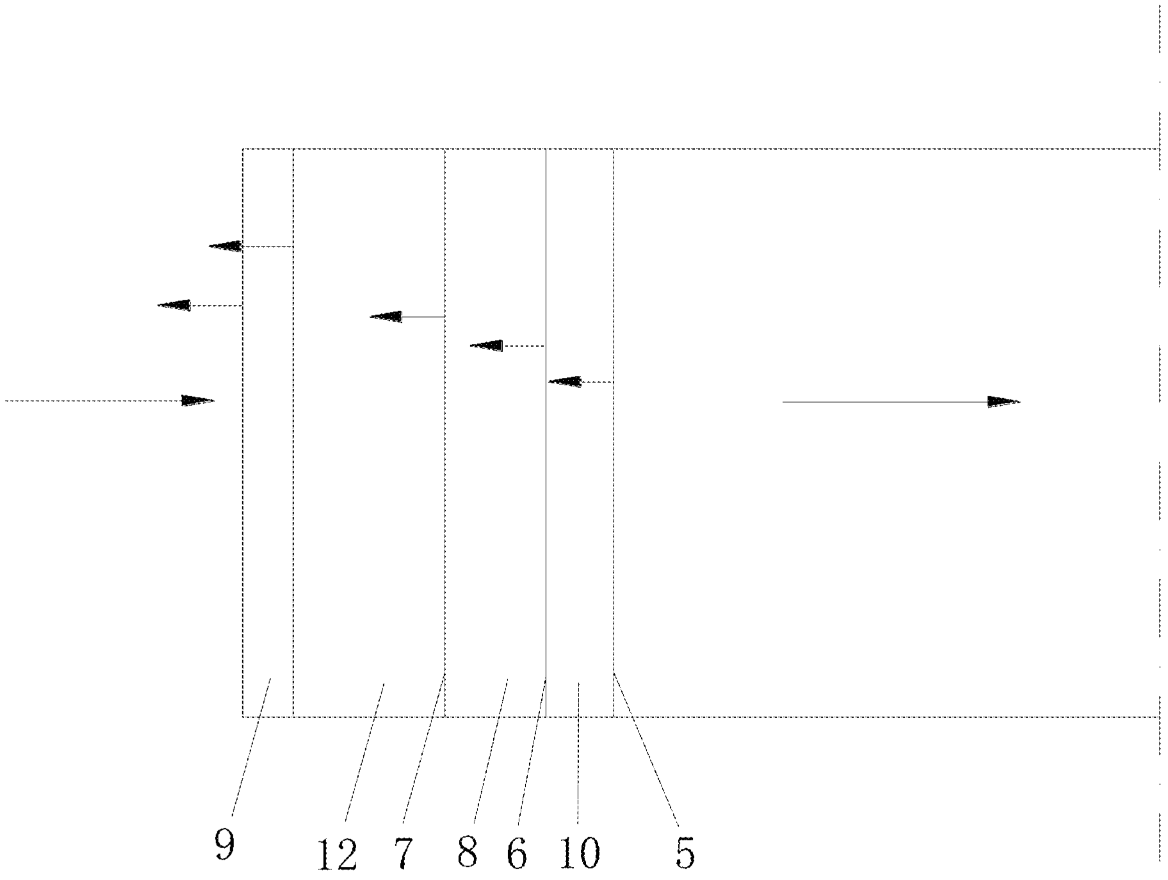
FIG. 2*a* illustrates reflection of a flat electromagnetic wave passing through the lens shown in FIGS. 1*a*-1*g*.
Figure 2B:
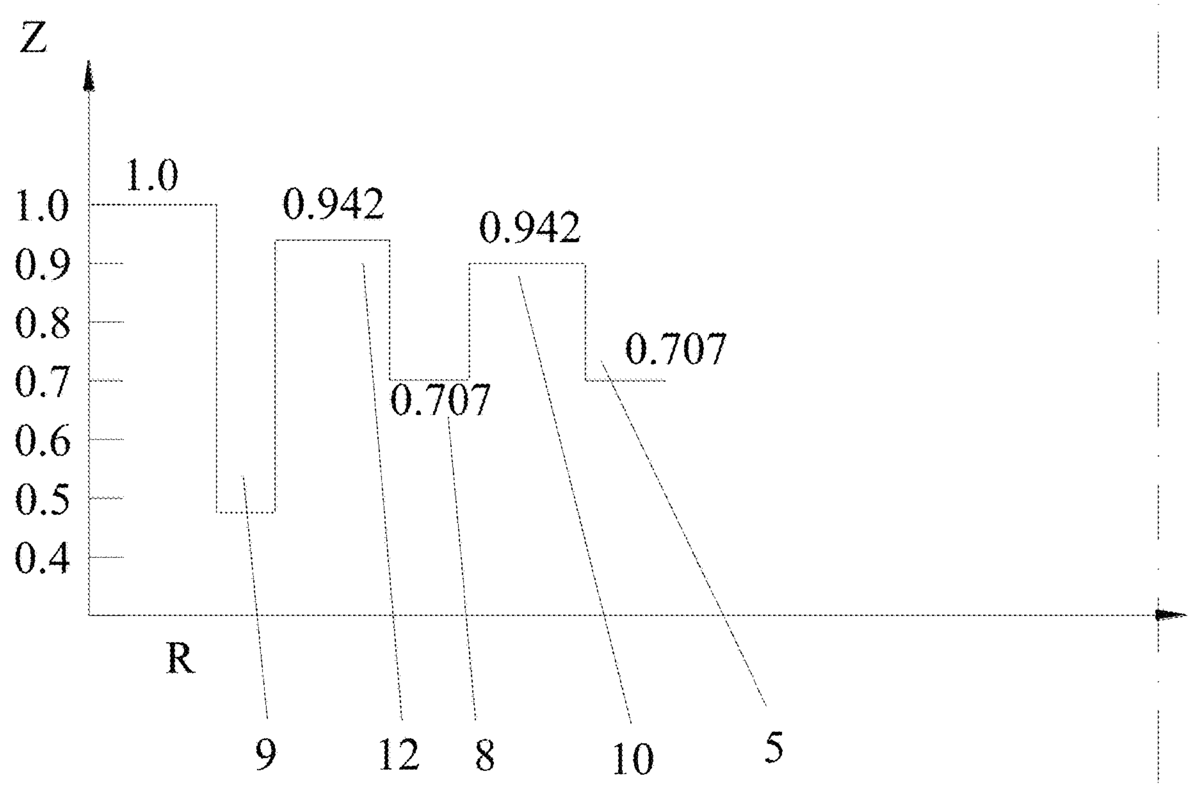
FIG. 2*b* shows normalized impedances of a matching transformer formed by the radome, rings of a foam dielectric material and rings of the conductive tubes.

FIG. 2*a* illustrates multiple reflections of a flat electromagnetic wave passing through the radome 9 and the rings 8, 10 and 12 having different values of dielectric permittivity ε to an axis of the lens. An impedance of a layer of dielectric materials normalized to an impedance of a free space is $Z=1/\sqrt{\varepsilon}$ therefore reflection of a flat electromagnetic wave from layers of dielectric materials can be calculated as reflection from seriously connected portions of transmission lines having different Z and lengths. FIG. 2*b* illustrates impedances of the radome 9 having outer radius R and the rings 8, 10 and 12.

Table 1 contains widths W and ε of rings forming a transformer for a lens made of an artificial dielectric material having dielectric permittivity ε=2.0 disposed inside of the circle 5. The radome 9 having thickness 3 mm and dielectric permittivity ε=4.3 is an outer portion of the transformer.

TABLE 1

| Radome | | Ring 12 | | Ring 8 | | Ring 10 | |
|---|---|---|---|---|---|---|---|
| W9 | ε9 | W12 | ε12 | W8 | ε8 | W10 | ε10 |
| 3.0 mm | 4.3 | 66.3 mm | 1.12 | 32.8 mm | 2.0 | 21.3 mm | 1.12 |

Table 2 contains electrical lengths L=W/ε and normalized impedances Z of seriously connected transmission lines modelling the matching transformer.

TABLE 2

| Radome | | Ring 12 | | Ring 8 | | Ring 10 | |
|---|---|---|---|---|---|---|---|
| L9 | Z9 | L12 | Z12 | L8 | Z8 | L10 | Z10 |
| 6.2 mm | 0.482 | 70.3 mm | 0.943 | 46.4 mm | 0.707 | 22.6 mm | 0.943 |

The calculated transformer provides VSWR=1.06 through wide frequency band 0.5-1.0 GHz therefore such manner could be applied for matching of different lenses used for wideband multi beam antennas including lenses for antennas used for base station of modern mobile communication.

The rings 10, 8 and 12 are formed together with the circle 5 in entire round sheet of a foam dielectric material with holes filled by the conductive tubes as it is shown in FIG. 1*g*. The provided manner of matching the lens with a free space doesn't need a complicated radome with a plurality of compartments like one described by U.S. Pat. No. 9,780,457 B2. Therefore, cost of manufacturing of the matched lenses is the same as lenses made of a lightweight artificial dielectric material having a substantially homogeneous dielectric permittivity ε. The rings 8, 10 and 12 together with the radome 9 create a wideband transformer having less length than a usual transformer consisting of sections having different impedances and equal lengths which is equal of quarter wave length in a free space of the nominal operating frequency. As a result, the lens in accordance with the present disclosure has lesser diameter than a lens providing the same gain in which ε smoothly decreases towards an outer contour of the lens.

In other embodiments of the present disclosure, the conductive tubes displaced in a layer could form other structures and lenses may include other quantities of different layers. For example, a cylindrical lens assembled of two kinds of different layers is shown in FIGS. 3*a*-3*e* where each layer includes a plurality of conductive tubes arranged in circles and having two orthogonal orientations of its axes.

FIGS. 3*a* and 3*b* show the top view and a cross-section A-A accordingly of a first layer 41 where conductive tubes 40*a* and 43*a* disposed inside of a circle 45 are arranged in a shape of a sunflower lattice. Axes of the conductive tubes 40*a* forming odd circles are directed in parallel to the layer and in parallel to the circle 45. Axes of conductive tubes 43*a* forming even circles are directed perpendicular to the layer. Conductive tubes 40*b*, disposed between circles 46 and 47, are arranged in two circles forming a ring 48 disposed between a circle 45 and a dielectric radome 49 and separated from ones by rings 50 and 52 formed by a foam dielectric material without conductive tubes. Axes of conductive tubes 40*b* are directed in parallel to the layer and in parallel to the circle 45. Axes of conductive tubes 43*b* are directed perpendicular to the layer. Thin dielectric rods 53 pass through all layers and fix mutual disposition of layers forming the lens.

FIGS. 3*c* and 3*d* show a top view and a cross-section E-E accordingly of a second layer where conductive tubes 60*a* and 63*a* disposed inside of a circle 45 are arranged in a shape of a sunflower lattice. Axes of the conductive tubes 60*a* forming odd circles are directed in parallel to the layer and perpendicular to the circle 45. Axes of conductive tubes 63*a* forming even circles are directed perpendicular to the layer. Conductive tubes 60*b* disposed between circles 46 and 47 are arranged in two circles forming a ring 48 disposed between a circle 45 and a dielectric radome 49 and separated from ones by rings 50 and 52 formed by a foam dielectric material without tubes. Axes of conductive tubes 60*b* are directed in parallel to the layer and perpendicular to the circle 45. Axes of conductive tubes 63*b* are directed perpendicular to the layer.

FIG. 3*e* shows cross-section A-A of a cylindrical lens including layers shown in FIGS. 3*a*-3*b* and layers shown in FIGS. 3*c*-3*d* separated by layers 54 of a foam dielectric material without conductive tubes. The layers are stacked together forming twelve assembling 44 providing desirable anisotropic properties.

The lens provides improved matching with a free space because the rings 48, 50 and 52 having different values of dielectric permittivity ε reflect electromagnetic wave passing through the lens in anti-phase compared with reflections from the radome 49 and the circle 45.

Additional reflections from the rings 48, 50 and 52 suppress reflections from the radome 49 and the circle 45 and improve matching the lens with a free space. Widths of the rings 48, 50 and 52 providing the best matching depend of the nominal operating frequency and thickness and dielectric permittivity & of the radome 49.

A group of focusing lenses which could be matched with a free space by the provided manner is not limited by the described above embodiments. Lenses may be also formed by other structures of the conductive tubes. For example, conductive tubes forming each layer could be directed to three orthogonal directions and conductive tubes forming a ring of the matching transformer could also contain conductive tubes having three orthogonal directions of axes. Such lenses could contain only one kind of layers.

It is to be understood that, if any prior art publication is referred to herein, such reference does not constitute an admission that the publication forms a part of the common general knowledge in the art in any country.

The invention claimed is:

1. A cylindrical focusing lens, comprising a dielectric radome and artificial dielectric material, wherein the artificial dielectric material comprises a plurality of sheets of a foam dielectric material disposed in layers and a plurality of conductive tubes placed in the sheets of the foam dielectric material, wherein the conductive tubes disposed in the sheets of the foam dielectric material form a circle and a ring surrounding the circle and separated from the circle and from the radome by rings of the foam dielectric material without the conductive tubes.

2. The cylindrical focusing lens according to claim 1, wherein the sheets of the foam dielectric material containing the conductive tubes are separated by sheets of the foam dielectric material without the conductive tubes.

3. The cylindrical focusing lens according to claim 2, wherein a width of the rings of the foam dielectric material without the conductive tubes disposed between the circle and the ring with the conductive tubes is 0.2-0.8 times a width of the ring of the foam dielectric material with the conductive tubes.

4. The cylindrical focusing lens according to claim 2, wherein a width of the rings of the foam dielectric material without the conductive tubes disposed between the radome and the ring with the conductive tubes is 1.0-4.0 times a width of the ring of the foam dielectric material with the conductive tubes.

5. The cylindrical focusing lens according to claim 1, wherein cross-sections of the conductive tubes are circular or polygonal.

6. The cylindrical focusing lens according to claim 5, wherein a width of the rings of the foam dielectric material without the conductive tubes disposed between the circle and the ring with the conductive tubes is 0.2-0.8 times a width of the ring of the foam dielectric material with the conductive tubes.

7. The cylindrical focusing lens according to claim 5, wherein a width of the rings of the foam dielectric material without the conductive tubes disposed between the radome and the ring with the conductive tubes is 1.0-4.0 times a width of the ring of the foam dielectric material with the conductive tubes.

8. The cylindrical focusing lens according to claim 1, wherein axes of the conductive tubes forming a ring and a circle are directed in a same direction.

9. The cylindrical focusing lens according to claim 8, wherein a width of the rings of the foam dielectric material without the conductive tubes disposed between the circle and the ring with the conductive tubes is 0.2-0.8 times a width of the ring of the foam dielectric material with the conductive tubes.

10. The cylindrical focusing lens according to claim 8, wherein a width of the rings of the foam dielectric material without the conductive tubes disposed between the radome and the ring with the conductive tubes is 1.0-4.0 times a width of the ring of the foam dielectric material with the conductive tubes.

11. The cylindrical focusing lens according to claim 1, wherein axes of the conductive tubes placed in different layers are directed in different directions.

12. The cylindrical focusing lens according to claim 11, wherein a width of the rings of the foam dielectric material without the conductive tubes disposed between the circle and the ring with the conductive tubes is 0.2-0.8 times a width of the ring of the foam dielectric material with the conductive tubes.

13. The cylindrical focusing lens according to claim 11, wherein a width of the rings of the foam dielectric material without the conductive tubes disposed between the radome and the ring with the conductive tubes is 1.0-4.0 times a width of the ring of the foam dielectric material with the conductive tubes.

14. The cylindrical focusing lens according to claim 1, wherein axes of the conductive tubes placed in one layer are directed perpendicular to the layer.

15. The cylindrical focusing lens according to claim 14, wherein a width of the rings of the foam dielectric material without the conductive tubes disposed between the circle and the ring with the conductive tubes is 0.2-0.8 times a width of the ring of the foam dielectric material with the conductive tubes.

16. The cylindrical focusing lens according to claim 14, wherein a width of the rings of the foam dielectric material without the conductive tubes disposed between the radome and the ring with the conductive tubes is 1.0-4.0 times a width of the ring of the foam dielectric material with the conductive tubes.

17. The cylindrical focusing lens according to claim 1, wherein axes of the conductive tubes placed in one layer are directed in parallel to the layer.

18. The cylindrical focusing lens according to claim 1, wherein axes of the conductive tubes placed in one layer are directed in parallel to the layer and perpendicular to axes of the conductive tubes disposed at other layers and directed in parallel to the other layers.

19. The cylindrical focusing lens according to claim 1, wherein a width of the rings of the foam dielectric material without the conductive tubes disposed between the circle and the ring with the conductive tubes is 0.2-0.8 times a width of the ring of the foam dielectric material with the conductive tubes.

20. The cylindrical focusing lens according to claim 1, wherein a width of the rings of the foam dielectric material without the conductive tubes disposed between the radome and the ring with the conductive tubes is 1.0-4.0 times a width of the ring of the foam dielectric material with the conductive tubes.

* * * * *